July 25, 1967
A. COLONNA
3,332,669
QUIVER MIXER
Filed Aug. 10, 1966
2 Sheets-Sheet 2
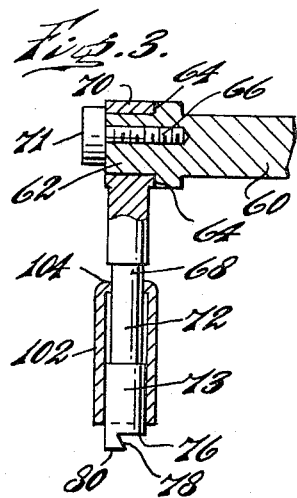
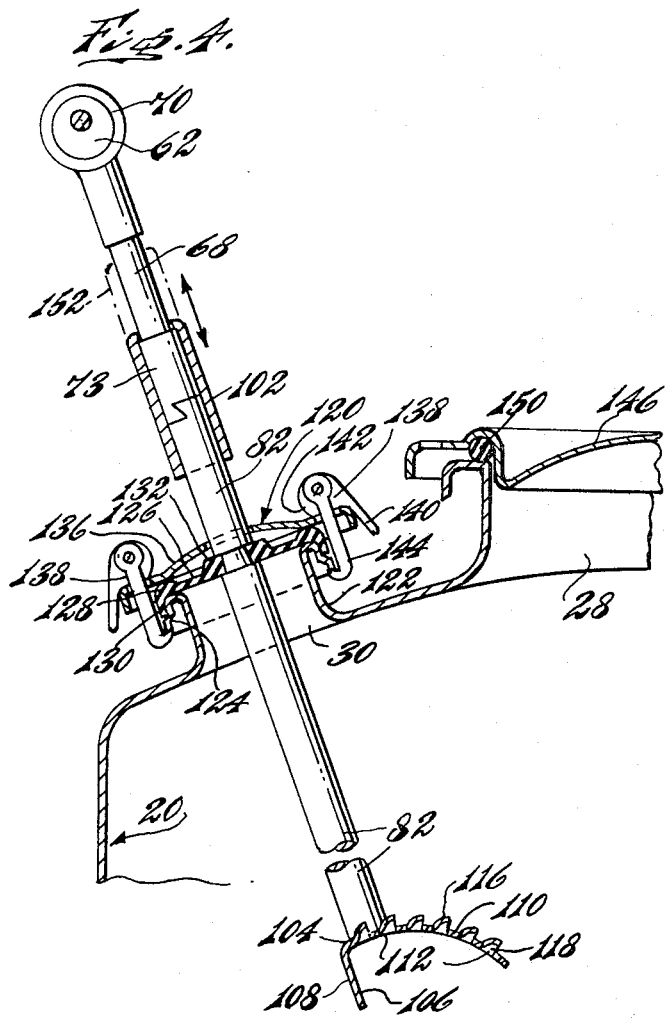
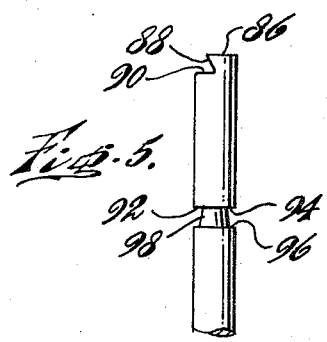
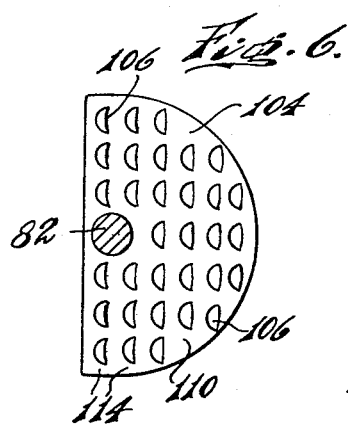
INVENTOR.
Angelo Colonna
BY
Wm. Steell Jackson and Sons
ATTORNEYS United States Patent Office 3,332,669
Patented July 25, 1967

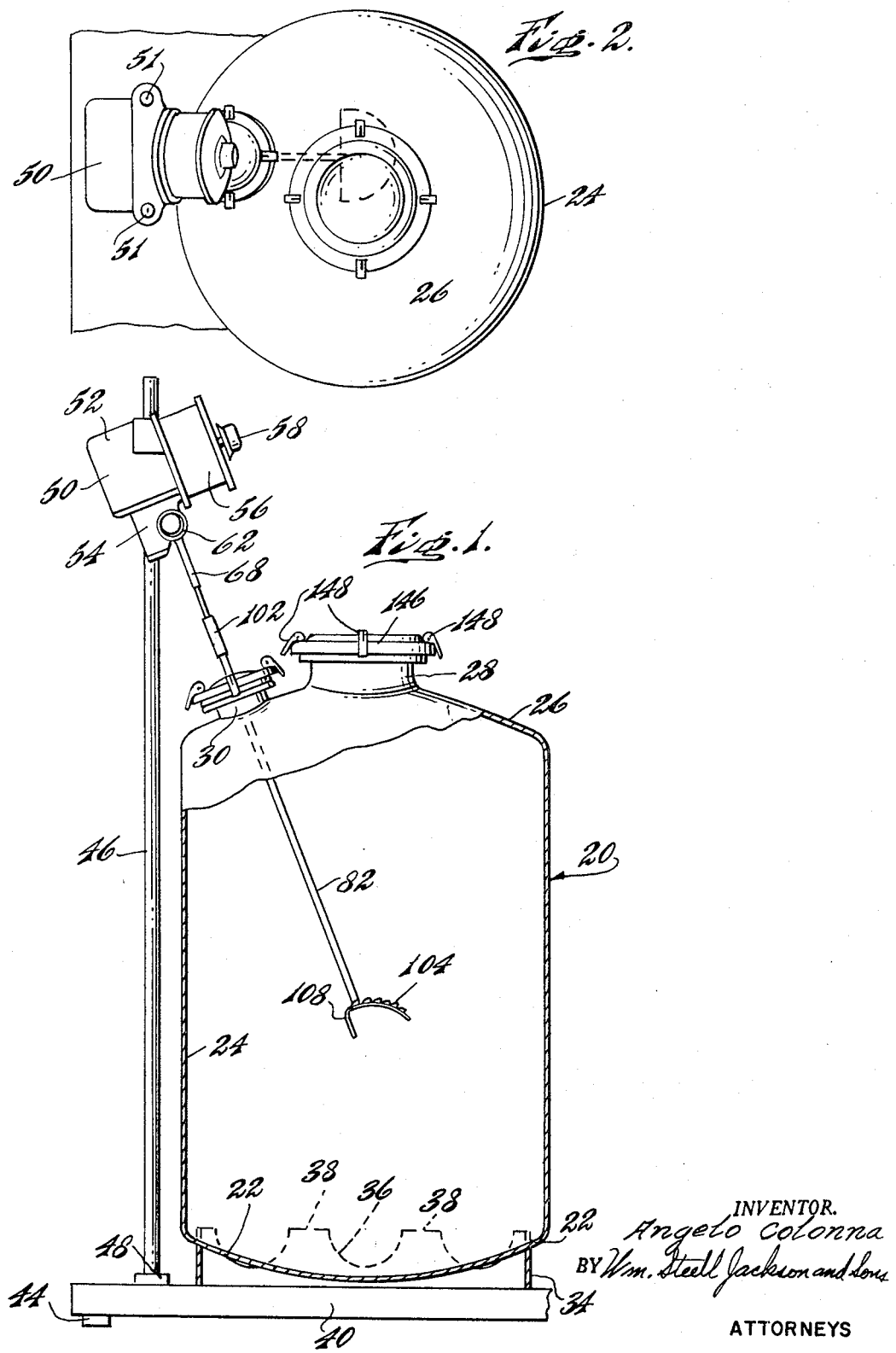

3,332,669
QUIVER MIXER
Angelo Colonna, 2114 Bowler St.,
Philadelphia, Pa. 19115
Filed Aug. 10, 1966, Ser. No. 571,549
3 Claims. (Cl. 259—113)

ABSTRACT OF THE DISCLOSURE

This invention is for a mixer adapted for ready insertion into all size containers for rapidly mixing liquids. The device consists essentially of a motor drive located outside the container, a shaft which extends from the motor drive through a seal in the container wall, and an agitator plate of a special shape and construction secured to the end of the shaft. In operation, the shaft reciprocates, or quivers, whereby the fluid is mixed or stirred in an orbital manner by virtue of the special shape and construction of the agitator plate.

This invention relates to mixers or stirrers, and more particularly, to a mixer having a quiver action which imparts to the fluid a circular or orbital mixing movement.

A purpose of the invention is to obtain a circular movement of fluid by means of a quiver type of stirring action.

A further purpose is to utilize an agitator plate in a certain form whereby fluid is gently forced through a series of perforations wherein the fluid is guided through an orbital path.

A further purpose is to eliminate a rotating propeller in a stirring action.

A further purpose is to utilize a short pulsating stroke which is imparted to a special-shaped quiver plate wherein liquid is mixed or stirred in a gentle but very effective manner.

A further purpose is to provide an agitator plate in a mixer which is self-cleaning and which does not clog.

A further purpose is to utilize or provide an agitator plate which on a forward stroke guides and forces liquid through a series of perforations and which on the return stroke prevents the liquid from passing through these perforations.

A further purpose is to shield perforations in an agitator plate wherein the liquid passes through the perforations on the forward stroke and wherein the liquid is prevented from passing through the perforations on the return stroke.

A further purpose is to provide a quiver mixer which can be driven from without, or outside, a closed container.

A further purpose is to provide a quiver mixer for use within a closed container.

Further purposes appear in the specification and in the claims.

In the drawings I have chosen to illustrate a few of the numerous embodiments in which the invention may appear, selecting the forms shown from the standpoints of convenience in illustration, satisfactory operation and clear demonstration of the principles involved.

FIGURE 1 is a side elevation of the mixer being used within a closed container, the container being partly broken away.

FIGURE 2 is a plan view of the mixer of FIGURE 1.

FIGURE 3 is an enlarged fragmentary section of the motor drive shaft and the quiver drive stub with an eccentric connection between the two.

FIGURE 4 is a fragmentary vertical section of the drive shaft, and seal shown in FIGURES 1 and 2.

FIGURE 5 is a fragmentary elevational view of the quiver drive stub of the invention.

FIGURE 6 is a top plan view of the agitator plate of the invention.

In the prior art, mixers or stirrers have basically been composed of perforated plates which reciprocate whereby liquid is forced through the holes and a stirring or mixing action results. The fluid in these types of mixers is stirred or mixed in a back-and-forth or to-and-fro type of action, and this is unsatisfactory for many types of mixing operations.

I have found that by providing a unique-shaped agitator plate having certain specific-shaped perforations, I can impart to the liquid a very effective stirring or mixing action wherein the liquid is forced or guided through an orbital path. The fluid, while traveling through this path, is gently forced through shielded perforations during the forward portion of the movement but is prevented from passing through the holes on the return movement of the plate by the shield and contour of the plate. Hence, this liquid is always moved in one direction.

To drive the agitator plate, I support a drive motor outside of the container holding the liquid being mixed or stirred, and I provide a reciprocating drive shaft between the drive motor and the agitator plate with effective sealing means extending between the container and the reciprocating drive shaft.

I show in the drawings container 20 which may be of metal or other suitable material having a bottom 22, side walls 24, a top 26, and upper openings 28 and 30. In the embodiment shown the opening 28 is the larger and is positioned centrally, and the opening 30 is smaller and is inclined to the vertical axis of the container, but this is by way of illustration and any suitable opening or openings may be used.

The container 20 shown has secured to the bottom thereof, a skirt 32 comprising a circularly extending wall 34 with cut-out portions 36 extending circumferentially about the skirt 32. Welds 38 secure the skirt to the bottom 22 of the container 20.

The container 20 is supported on a platform 40 having a floor 42 and legs 44. Columns 46 and 47, suitably circular in cross section, extend vertically upward from the platform 40 and are secured at their end at 48 by means of a lock nut or other fastening means. A drive motor 50 is adjustably secured to the shafts 46 and 47 at the tops thereof by clamps at 51. The drive motor 50 comprises a drive portion 52, a gear reducer 54 operatively connected to the drive portion 52, rheostat 56 controlling and varying the voltage to the drive portion 52 to vary the speed thereof, and a control knob 58 operating the rheostat 56.

Drive shaft 60 extends from the gear reducer 54 and has at the end thereof an eccentric 62, a flange 64 and a tapped hole 66 extending longitudinally of the drive shaft 60.

A stub shaft 68 is operatively connected to the drive shaft 60 at eccentric 62 by a circular bearing 70, whereby the rotational motion of the shaft 60 is converted to reciprocating motion of the stub shaft 68. A thread cap screw 71 secures the bearing 70 onto the eccentric 62. The stub shaft 68 has a reduced diameter portion 72 and a raised portion 73 which has at the end thereof an end connection 74 having a transverse portion 76, an inclined portion 78, and an end portion 80. A circular cross sectional sleeve 102 having bent-over portion 104 is slidably secured over stub shaft 68 in a manner which allows the sleeve to slide upward with the bent portion 104 extending over and into the reduced cross sectional portion 72.

The agitator plate shaft 82 has an end portion 86 which engages stub shaft transverse portion 76, an inclined flat surface 88 which engages stub shaft inclined surface 78, and a transverse portion 90 which engages stub shaft end surface 80. The agitator shaft 82 also has a necked-down portion 92 having shoulders 94 and 96 and a sloping portion 98. The agitator shaft 82 is connected at its end 100 to agitator plate 106.

Agitator plate 106 is seen in side elevation in FIGURE 4 and top plan view in FIGURE 6 and a description will be made referring to these two figures. In elevation, the plate 106 has a straight, flat portion 108 extending in a direction parallel to the axis of agitator shaft 82, and a curved portion 110 extending generally in the form of an arc of a circle from the surface 110.

The plate 104 is preferably formed from a metal sheet by bending into the form shown, but permissibly the plate may be composed of sections welded or otherwise joined. The curved surface 110 has a plurality of perforations 112 spaced therein, preferably in rows 114 as shown in FIGURE 6. The perforations are formed by displacing metal in the shape of a semi-circle into a hood 116 extending over and shielding the perforations 112. The hood 116 forms an outlet 118 which extends in a plane perpendicular to the plane of the perforation 112 in the curved portion 110.

The size of the perforations may vary depending on the liquid being mixed or stirred, but generally it is desirable to have a relatively large number of perforations, so that the perforations themselves are quite small.

The agitator shaft 82 extends into the container through a seal 120 best seen in FIGURE 4. Opening 30 is formed by circularly extending wall 122 which has an outwardly and downwardly extending flange 124 on its end displaced from the container 20. A flexible diaphragm 126 having a bulbous rim 128 and a lip 130 extends over opening 130, with the lip 130 engaging and partially covering flange 124. An integral raised or bossed section 132 extends concentrically in the center of the diaphragm 126 and has extending therethrough an aperture 134 which is of the shape of the necked-down portion 92 of the agitator shaft, but which is slightly smaller in size. The height of the boss 132 is slightly smaller than the distance between the shoulders 94 and 96 on the agitator shaft 82.

A metal cover 136 extends over the diaphragm 126 and is held onto the flange 124 by quick acting clamps 138 as shown. These claims are disclosed in detail in my copending application, Ser. No. 518,718, filed Jan. 4, 1966 for Rapid Seal Closure Container. The clamps have an operating handle 140, an eccentric 142, and a latching hook 144. Any other suitable clamp may be used.

A cover 146 having similar clamps 148, along with a seal 150 closes opening 28. A hole 150 permits the agitator shaft 82 to extend through the cover 136.

In operation, container 20 containing the liquid to be stirred or mixed is placed on the platform 40 in an area adjacent to the columns 46. The liquid is poured into the container through opening 28 and sealed with cover 146 and seal ring 150.

The agitator shaft 82 is separate at this time from the stub shaft 64, the severance having been accomplished by sliding sleeve 102 upward into the position shown by the dotted lines 152 and displacing the agitator shaft 82 from the stub shaft 64. The end 86 of the agitator shaft 82 is inserted through aperture 134 in diaphragm 126 which is flexible, until reduced portion 92 engages bossed section 132 as shown in FIGURE 4. The diaphragm 126 is then placed in position over opening 30 and cover 136 placed over the diaphragm 126, with the agitator shaft 82 extending through hole 150.

The container 20 is then moved into position so that agitator shaft 82 aligns with, and connects, to stub shaft 64 while the sleeve 102 is held in an upward position 152. When the shafts 82 and 64 are connected and aligned as shown in FIGURE 4, the sleeve 102 is allowed to drop, whereby the shafts are hold together by the interlocking surfaces 76, 78, 80, and 86, 88, 90 respectively.

The drive motor 52 is then connected to a suitable power source and turned on. The speed of the motor is adjusted through rheostat 58. The agitator shaft, 82, through stub shaft 68 and eccentric 62, is then subjected to a rapid, reciprocating motion, and agitator plate 104 is likewise reciprocated. The rate of reciprocation desirably ranges from 75 to 800 cycles per minute, but higher speeds may be used.

The liquid is subjected by the agitator plate to an orbital, one way movement, as shown by the arrows in FIGURE 4. On the downward stroke of the plate 104, the liquid is forced through perforations 112 against the underside of hood 116. The curved hood guides the liquid out through openings 118 and forces the liquid in a direction tangential to the curve of the plate. On the return or upward stroke of the agitator plate, the hood 116 prevents liquid above the plate from passing downward through the perforations, but rather forces the liquid above the plate to flow in the direction of the arrows and tangential to the plate. Liquid flows into the space beneath the agitator plate. Liquid flows into the space beneath the agitator plate on the upward movement of the plate at the open ends thereof. The throw of the eccentric 62 may be of any suitable distance, such as 1/8 inch.

At the completion of the mix or stir, the agitator shaft 82 can be disengaged from the stub shaft 68 by raising sleeve 102. The agitator plate and shaft can remain in the container 20, and a new container brought into position, with a separate agitator plate and shaft, to be energized by the drive motor 50.

In view of my invention and disclosure, variations and modifications to meet individual whim or particular need will doubtless become evident to others skilled in the art, to obtain all or part of the benefits of my invention without copying the apparatus shown, and I therefore, claim all such insofar as they fall within the reasonable spirit and scope of my claims.

Having thus described my invention, what I claim as new and desire to secure by Letters Patent is:

1. In a mixer for liquid held in a container, a drive motor, means for supporting the drive motor with respect to the container, a shaft operatively connected at one end to the drive motor and extending from the drive motor into the container, an agitator plate fixed to the shaft on the end remote from the drive motor and within the container, said agitator plate comprising a flat portion and a curved portion disposed normally to the flat portion, the curved portion having a series of perforations and hoods respectively extending above and over the perforations, and sealing means extending between the shaft and the container, the shaft being driven in a longitudinally reciprocating manner by the drive motor, whereby the liquid within the container is stirred by the agitator plate in a one-way orbital direction, the liquid being forced through the perforations on the forward movement of the agitator plate and the liquid being substantially blocked from passage through the perforations by the hoods on the rearward movement of the agitator plate.

2. A device of claim 1, wherein the shaft is segmented, the segments being connected by an arrangement comprising a Z-formed end on each of the segments and a slidable sleeve concentrically extending around the segments.

3. A device of claim 1, wherein the sealing means includes a flexible diaphragm having a bulbous rim, a rigid cover extending over the diaphragm, and clamping means for securing the rigid cover to the container over the bulbous rim.

(References on following page)

References Cited

UNITED STATES PATENTS

| | | | |
|---|---|---|---|
| 834,370 | 10/1906 | Dodge | 259—113 X |
| 1,890,307 | 12/1932 | Shailer et al. | 259—113 |
| 2,520,032 | 8/1950 | Estes | 259—141 X |

FOREIGN PATENTS

| | | |
|---|---|---|
| 1,025,543 | 1/1953 | France. |

WILLIAM I. PRICE, *Primary Examiner.*

R. W. JENKINS, *Assistant Examiner.*